United States Patent
Wagener

[11] Patent Number: 6,164,988
[45] Date of Patent: Dec. 26, 2000

[54] ADAPTER WITH AN ADAPTER HOUSING AND WITH EQUIPMENT HOLDERS FOR ELECTRICAL INSTALLATION EQUIPMENT WHICH CAN BE FASTENED THEREON

[75] Inventor: Hans Wagener, Dietzhölztal, Germany

[73] Assignee: Rittal-Werk Rudolf Loh GmbH & Co., KG, Herborn, Germany

[21] Appl. No.: 09/211,331

[22] Filed: Dec. 15, 1998

[30] Foreign Application Priority Data

Dec. 15, 1997 [DE] Germany .......................... 197 55 841

[51] Int. Cl.⁷ .................................................. H01R 25/00
[52] U.S. Cl. ........................... 439/110; 439/121; 439/113
[58] Field of Search .................................. 439/110, 121, 439/113, 115

[56] References Cited

U.S. PATENT DOCUMENTS

| | | | |
|---|---|---|---|
| 3,894,781 | 7/1975 | Danato ..................................... | 439/121 |
| 3,963,294 | 6/1976 | Heritage ................................... | 439/110 |
| 4,256,357 | 3/1981 | Vasseur et al. .......................... | 439/121 |
| 5,336,100 | 8/1994 | Gabrius et al. ......................... | 439/115 |

FOREIGN PATENT DOCUMENTS

| | | |
|---|---|---|
| 42 42 704 A1 | 6/1994 | Germany . |
| 195 15 923 C2 | 5/1997 | Germany . |

*Primary Examiner*—Paula Bradley
*Assistant Examiner*—Katrina Davis
*Attorney, Agent, or Firm*—Pauley Petersen Kinne & Fejer

[57] ABSTRACT

An adapter with an adapter housing, which can be fixed in place on the bus bars of a bus bar system and which receives terminal contacts, which can be connected in an electrically conducting manner with the bus bars. An equipment holder for fastening electrical installation equipment can be connected in various positions with the adapter housing. The equipment holder has holding elements and the adapter housing has receiving elements for the holding elements of the equipment holder. Continuous adjustability between the equipment holder and the adapter housing is achieved because the holding elements of the equipment holder are designed as support strips, which can be inserted into receiving elements of the adapter housing which are embodied as receiving grooves, or as edge strips, and which are continuously displaceable along and fixable within the receiving elements.

12 Claims, 2 Drawing Sheets

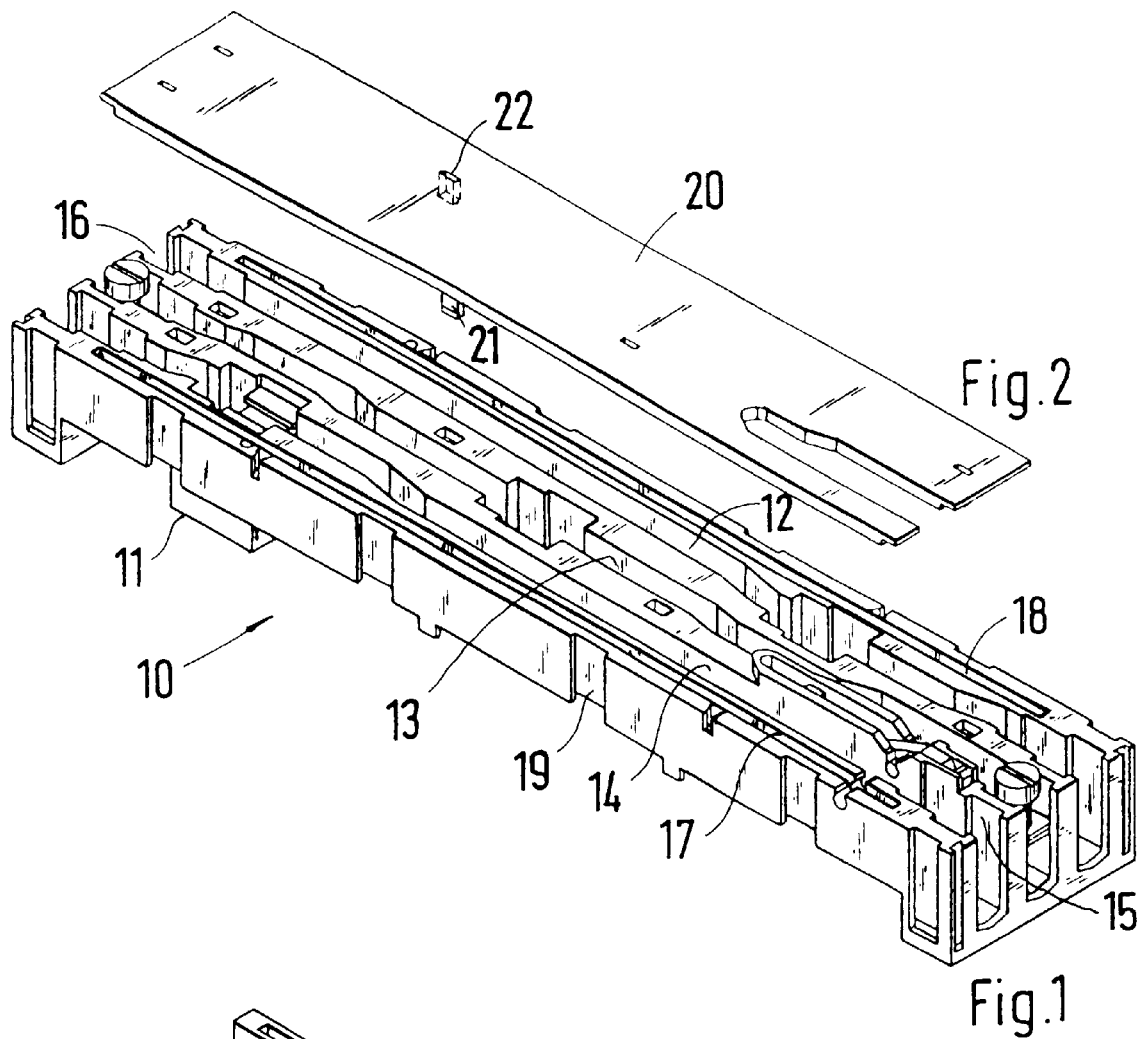
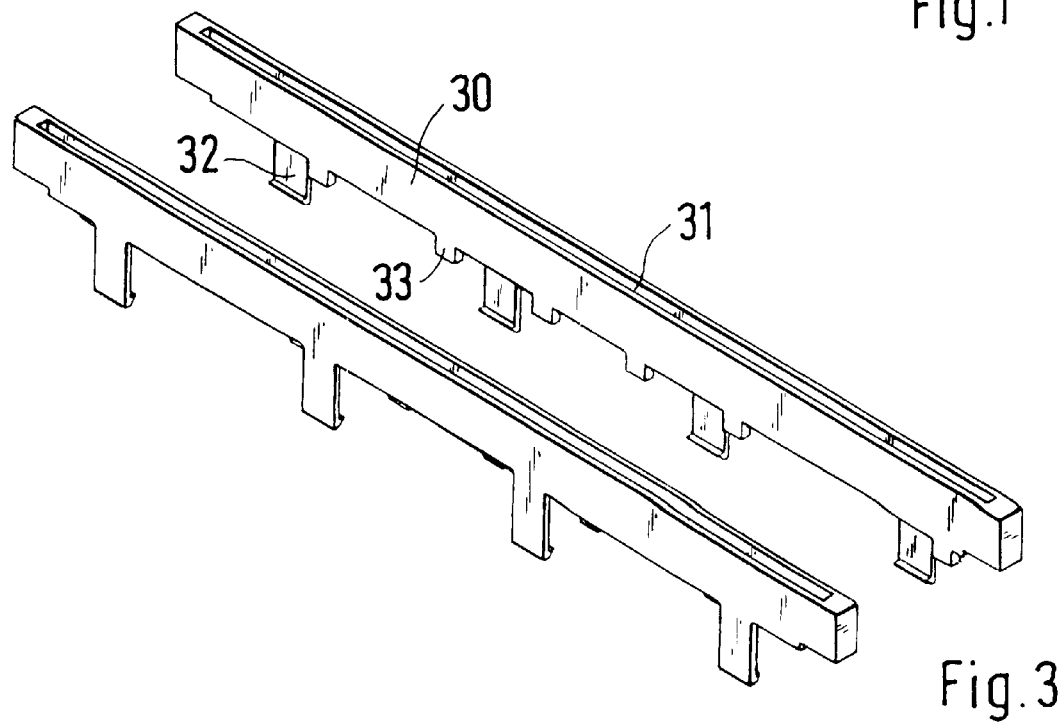

ADAPTER WITH AN ADAPTER HOUSING AND WITH EQUIPMENT HOLDERS FOR ELECTRICAL INSTALLATION EQUIPMENT WHICH CAN BE FASTENED THEREON

BACKGROUND OF THE INVENTION

1. Field of the Invention

This invention relates to an adapter with an adapter housing, which can be fixed in place on bus bars of a bus bar system and receives terminal contacts, and which can be connected in an electrically conducting manner with the bus bars, wherein an equipment holder for fastening electrical installation equipment can be connected in various positions with the adapter housing, and the equipment holder has holding elements and the adapter housing has receiving elements for the holding elements of the equipment holder.

2. Description of Prior Art

An adapter of this type is known from German Patent Publication DE 42 42 704 A1. In an area of edges of longitudinal sides, the adapter housing has upwardly extending perforated strips formed on it, whose perforations are aligned with each other and are arranged uniformly distributed. At the spacing of the rows of perforations, the equipment holder has two arresting pins, which can be inserted into a pair of perforations of the perforated strips and in this way fix the spacing between the adapter housing and the equipment holder. In this case the distribution of the perforations in the perforated strips determines the stepped adjustability of the equipment holder on the adapter housing. Two guide strips are formed on the equipment holder, which are placed against the facing insides of the two perforated strips and thus the two guide strips determine the position of the equipment holder transversely with respect to the longitudinal sides of the adapter. This matching of the adapter housing and the equipment holder only results in a stepped position adjustment of the electrical installation equipment transversely with respect to the bus bars, and in addition, the upward extending perforated strips of the adapter housing obstruct its use with other adapter embodiments and other types of fastenings of installation equipment.

An adapter known from German Patent Publication DE 195 15 923 C2 has the same disadvantages.

SUMMARY OF THE INVENTION

It is one object of this invention to create an adapter wherein the position of the equipment holders on the adapter housing transversely to the bus bars can be continuously changed, and the adapter housing can also be used to construct different adapters without interference by the receiving elements for the equipment holder.

In accordance with this invention, this object is attained with holding elements of the equipment holders embodied as support strips, which can be inserted into receiving elements of the adapter housing, embodied as receiving grooves, or of edge strips, and which are continuously displaceable along them and can be fixed in place therein.

With this design of the holding elements of the equipment holder and the receiving element, the electrical installation equipment fastened on the equipment holder can be continuously displaced transversely with respect to the bus bars, and therefore also with respect to terminal contacts arranged in the area of the narrow sides of the adapter housing. The receiving elements do not project past the top of the adapter housing, so that a uniform finishing plane is achieved, by which other structures can also be fixed in place without obstruction.

In accordance with one embodiment, the receiving grooves are cut in an area of the longitudinal sides of the top of the adapter housing, and the receiving grooves are formed into the top of the edge strips. The edge strips have snap-in springs, which can be inserted and/or snapped into the receiving grooves of the adapter housing.

In this case the equipment holder can then selectively be attached directly to the adapter housing or on the edge strips applied to the adapter housing, wherein the continuous adjustability of the equipment holder is always attainable.

If in accordance with a further embodiment the receiving grooves of the adapter housing and of the edge strips are designed as snap-in grooves, and the support strips of the equipment holder are embodied as snap-in strips, such as in many cases a sufficient sturdiness of the connection is already achieved when the equipment holder is attached to the adapter housings the edge strips are attached to the adapter housing and the equipment holder is attached to the edge strips. With heavy and large installation equipment, the holding can be additionally improved with the equipment holder fixedly connected with the adapter housing or the edge strips using screw connections.

If the adapter housing has formed-in receptacles for contact strips., which provide a connection between the bus bars and the connecting contacts, the adapter can be protected against touching in a top area because the top of the adapter housing is covered by a cover element between the receiving grooves or the attached edge strips.

To simplify assembly, the top of the adapter housing has snap-in connection receivers between the receiving grooves and an underside of the cover element with snap-in connection elements is matched and aligned with them.

BRIEF DESCRIPTION OF THE DRAWINGS

This invention will be explained in greater detail by means of an exemplary embodiment represented in the drawings, wherein:

FIG. 1 is a perspective view of an adapter housing with receiving grooves as the receiving elements for an equipment holder;

FIG. 2 is a perspective view of a cover element for covering the top of the adapter housing, such as shown in FIG. 1;

FIG. 3 is a perspective view of separate edge strips with receiving grooves as the receiving element for an equipment holder, which can be connected with the adapter housing.

DESCRIPTION OF PREFERRED EMBODIMENTS

Figure 4:
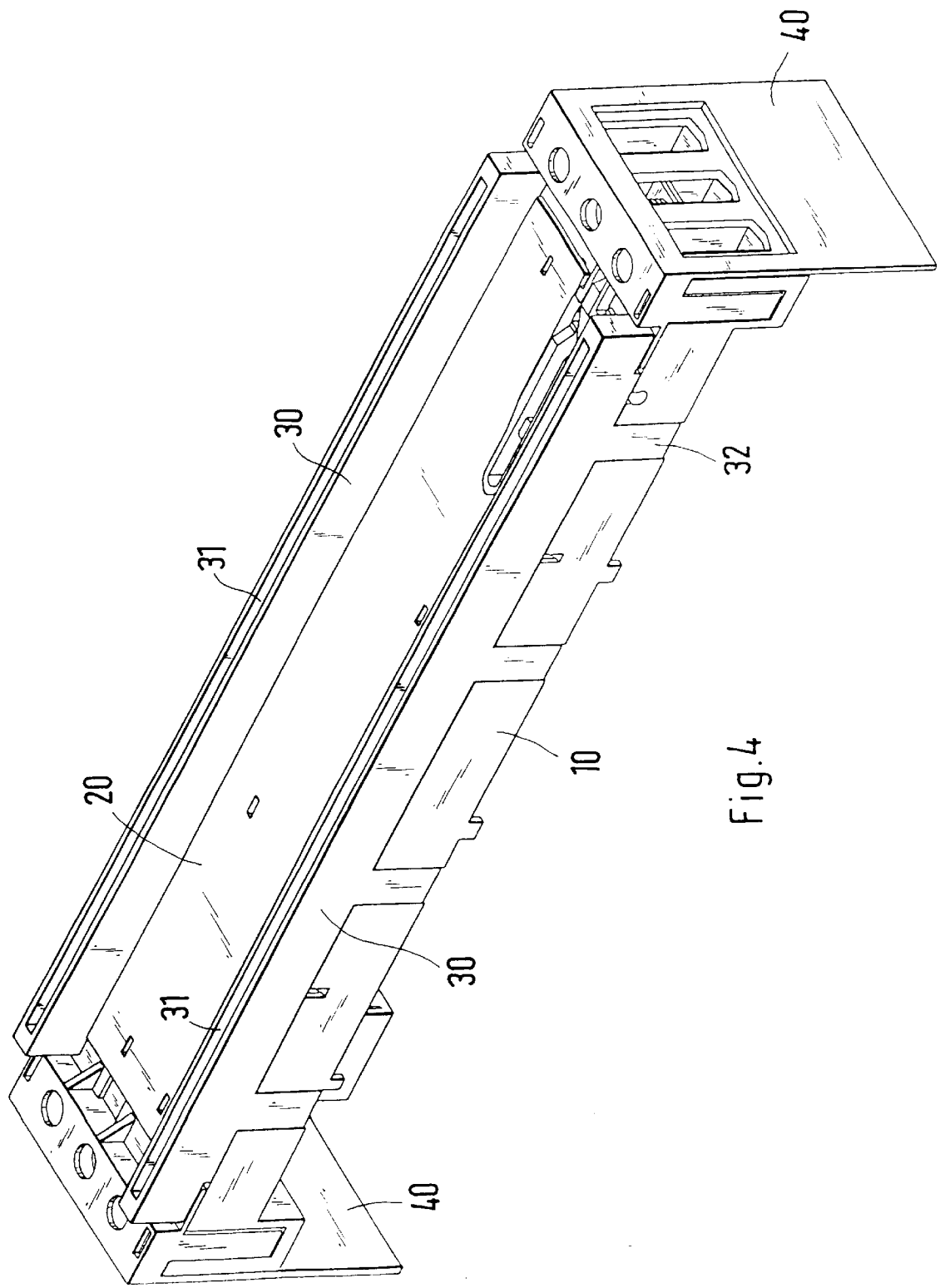
FIG. 4 is a perspective view of an adapter assembled from an adapter housing as shown in FIG. 1, a cover element as shown in FIG. 2 and a pair of edge strips as shown in FIG. 3.

The adapter housing 10 in accordance with FIG. 1 has suspension hooks 11 formed on the adapter housing 10 for being suspended from the bus bars of a bus bar system. The number of suspension hooks and their distribution on the adapter housing 10 depends on the number of the bus bars and their spacing in the bus bar system. Receptacles 12, 13 and 14 for contact rails are formed into a top of the adapter housing 10, which in a known manner make electrical connections between the terminal contacts placed in contact receptacles 15, or respectively 16, in the area of the narrow sides, and connecting contacts of the suspension hooks and thus the bus bars.

Receiving grooves 17 and 18 are formed in an edge area of the longitudinal sides of the adapter housing 10 as the receiving elements, which can also be designed as snap-in receiving grooves. The snap-in receivers can be easily ejected from the direction of the underside of the adapter housing 10.

The top of the adapter housing 10 additionally supports snap-in receivers, so that assemblies with correspondingly embodied and distributed snap-in elements can be connected with the adapter housing 10. A top hat rail-like equipment holder can have support strips on its underside, which are matched to the distance between the receiving grooves 17 and 18 of the adapter housing 10 and which therefore can be inserted into the receiving grooves 17 and 18. In this case the equipment holder remains arbitrarily displaceable in the receiving grooves 17 and 18, even if the support strips are designed as snap-in strips and the receiving grooves 17 and 18 as snap-in receiving grooves. Such equipment holder can additionally have screw receptacles for fastening screws, which can be directly screwed together with the receiving grooves 17 and 18, or with sliding nuts, which are inserted into the receiving grooves 17 and 18 and are held there captively, but displaceably.

As FIG. 2 shows, it is possible to cover the top of the adapter housing 10 so that it is protected from touching, along with the installed contact rails and terminal contacts, by means of a cover element 20. As suggested by reference numerals 21 and 22, the cover element 20 can have connecting elements, which can be inserted into connecting receivers between the receiving grooves 17 and 18 in the top of the adapter housing 10 and can there be snapped in place. In this case the cover element 20 can also be arranged in such a way that the cover element 20 leaves the receiving grooves 17 and 18 free, so that the edge strips 30 in accordance with FIG. 3 remain connectable with the adapter housing 10. On their tops, the edge strips 30 also have receiving grooves 31 as the receiving elements, which can also be designed as snap-in receiving grooves. Snap-in springs 32 and 33 are formed on the undersides of the edge strips 30, which can be inserted into snap-in receivers 19 and into the receiving grooves 17 and 18 and can there be snapped in place, resulting in an adapter as represented in FIG. 4. The equipment holder can be inserted using support strips within the receiving grooves 31 of the edge strips 30 and can be brought into the desired position therein before it is fixedly connected using screw connections with the edge strips 30, if this is required, and is fixed in placed absolutely securely in the set position.

What is claimed is:

1. In an adapter having a housing which can be fixed on bus bars of a bus bar system, wherein the housing receives terminal contacts, wherein the housing can be connected in an electrically conducting manner with the bus bars, wherein a holder has support strips for connecting electrical equipment in various positions with the housing, and wherein the housing has first receiving grooves, the improvement comprising:

a plurality of edge strips (30) forming a plurality of second receiving grooves (31), the edge strips (30) connectable with the first receiving grooves (17, 18), the support strips insertable into one of the first receiving grooves (17, 18) and the second receiving grooves (31), and the support strips continuously displaceable along and fixable within the second receiving grooves (31).

2. The adapter in accordance with claim 1, wherein the edge strips (30) have a plurality of snap-in springs (32, 33) engageable within the first receiving grooves (17, 18) of the housing (10).

3. The adapter in accordance with one of claim 1, wherein the first receiving grooves (17, 18) of the housing (10) and the second receiving grooves (31) of the edge strips (30) are designed as snap-in grooves, and the support strips are designed as snap-in strips.

4. The adapter in accordance with claim 1, wherein the holder is fixedly connected with one of the adapter housing (10) and the edge strips (30) by a plurality of screw connections.

5. The adapter in accordance with claim 1, wherein each of the first receiving grooves (17, 18) is positioned near one of a plurality of longitudinal sides of the housing (10).

6. The adapter in accordance with claim 5, wherein the edge strips (30) have a plurality of snap-in springs (32, 33) engageable within the first receiving grooves (17, 18) of the housing (10).

7. The adapter in accordance with claim 6, wherein the first receiving grooves (17, 18) of the housing (10) and the second receiving grooves (31) of the edge strips (30) are designed as snap-in grooves, and the support strips are designed as snap-in strips.

8. The adapter in accordance with claim 7, wherein the housing (10) is covered by a cover element (20) positioned between one of the first receiving grooves (17, 18) and one of the edge strips (30).

9. The adapter in accordance with claim 8, wherein the housing (10) has a plurality of snap-in connection receivers between the first receiving grooves (17, 18), and an underside of the cover element (20) has a plurality of matched and aligned snap-in connection elements.

10. The adapter in accordance with claim 9, wherein the holder is fixedly connected with one of the adapter housing (10) and the edge strips (30) by a plurality of screw connections.

11. The adapter in accordance with claim 1, wherein the housing (10) is covered by a cover element (20) positioned between one of the first receiving grooves (17, 18) and one of the edge strips (30).

12. The adapter in accordance with claim 11, wherein the housing (10) has a plurality of snap-in connection receivers between the first receiving grooves (17, 18), and an underside of the cover element (20) has a plurality of matched and aligned snap-in connection elements.

* * * * *